(12) United States Patent
Byard

(10) Patent No.: US 11,086,874 B2
(45) Date of Patent: Aug. 10, 2021

(54) MANAGEMENT OF A VIRTUAL INFRASTRUCTURE VIA AN OBJECT QUERY LANGUAGE

(71) Applicant: VMware, Inc., Palo Alto, CA (US)

(72) Inventor: David Byard, Sunnyvale, CA (US)

(73) Assignee: VMware, Inc., Palo Alto, CA (US)

(*) Notice: Subject to any disclaimer, the term of this patent is extended or adjusted under 35 U.S.C. 154(b) by 521 days.

(21) Appl. No.: 15/365,482

(22) Filed: Nov. 30, 2016

(65) Prior Publication Data
US 2018/0060397 A1    Mar. 1, 2018

Related U.S. Application Data

(60) Provisional application No. 62/380,863, filed on Aug. 29, 2016.

(51) Int. Cl.
*G06F 16/2455* (2019.01)
*G06F 16/25* (2019.01)
*G06F 9/455* (2018.01)
*G06Q 10/08* (2012.01)

(52) U.S. Cl.
CPC ...... *G06F 16/2455* (2019.01); *G06F 9/45558* (2013.01); *G06F 16/256* (2019.01); *G06Q 10/087* (2013.01); *G06F 2009/45595* (2013.01)

(58) Field of Classification Search
CPC ....... G06F 2009/45595; G06F 16/2455; G06F 16/256
See application file for complete search history.

(56) References Cited

U.S. PATENT DOCUMENTS

| 8,805,875 | B1* | 8/2014 | Bawcom | G06F 16/245 707/770 |
| 2016/0055022 | A1* | 2/2016 | Mcdonough | G06Q 40/04 718/1 |
| 2017/0093640 | A1* | 3/2017 | Subramanian | H04L 41/12 |
| 2017/0337147 | A1* | 11/2017 | Patel | G06F 13/36 |

OTHER PUBLICATIONS

Kelaidonis et al., "Virtualization and Cognitive Management of Real World Objects in the Internet of Things", IEEE GreenCom, 2012 (Year: 2012).*

(Continued)

*Primary Examiner* — Lewis A Bullock, Jr.
*Assistant Examiner* — Kevin X Lu

(57) ABSTRACT

Management of a virtual infrastructure via an object query language module is described. The virtual infrastructure includes one or more virtual machines, and one or more host machines communicatively coupled with the one or more virtual machines. The virtual infrastructure also includes a centralized management tool communicatively coupled with the one or more host machines. The object query language module fetches information from the one or more host machines and the one or more virtual machines. It further provides commands to the one or more host machines and the one or more virtual machines. In response to the fetch and command of the one or more host machines and the one or more virtual machines, a result of the fetch and command is displayed via a graphical user-interface.

14 Claims, 13 Drawing Sheets

(56) References Cited

OTHER PUBLICATIONS

Unknown Author, "Maxta Provides First Hyper-Converged Solution Certified for Cisco UCS Server Platform SUpporting Metro Distances", www.maxta.com/press/maxta-provides-first-hyper-converged-solution-certified-cisco-ucs-server-platform-supporting-metro-distances/, Nov. 14, 2014 (Year: 2014).*

Unknown Author, "VMware Hyper-Converged Infrastructure", www.zones.com/site/statics/static_page.html?name=partner/vmware/hyper-converged-infrastructure/index, Aug. 2015 (Year: 2015).*

Unknown Author, "VxRAIL—Small size. Big Ideas.", //tullyal.wordpress.com/tag/vxrail/, Mar. 2016 (Year: 2016).*

Unknown authors ("how long do your esxi machines take to boot?", hardforum.com/threads/how-long-do-your-esxi-machines-take-to-boot.1708577/, Jul. 31, 2012) (Year: 2012).*

Poitras ("The Nutanix Bible", Aug. 14, 2015, web.archive.org/web/20150814050841/http://stevenpoitras.com/the-nutanix-bible) (Year: 2015).*

Google Search note, "dell 'no backplane' vmware", conducted Nov. 18, 2020, search results limited to prior to Aug. 1, 2016. (Year: 2020).*

* cited by examiner

```
vCenter.login("user", "pass");

vmList = vCenter.getAllVMs();

for in vmList:

if vm.getOS() == "Ubuntu 12.04":

vm.restart()
```

FIG. 10

MANAGEMENT OF A VIRTUAL INFRASTRUCTURE VIA AN OBJECT QUERY LANGUAGE

CROSS-REFERENCE TO RELATED APPLICATIONS (PROVISIONAL)

This application claims priority to and benefit of U.S. Provisional Patent Application No. 62/380,863 filed on Aug. 29, 2016, entitled "AN APPARATUS FOR THE MANAGEMENT OF A VIRTUAL INFRASTRUCTURE VIA AN OBJECT QUERY LANGUAGE LEVERAGING SOURCES OF TRUTH" by David Byard, and assigned to the assignee of the present application, the disclosure of which is hereby incorporated herein by reference in its entirety.

FIELD OF THE INVENTION

This invention generally relates to the management of a virtual infrastructure across a network leveraging an object query language.

BACKGROUND

Object query language is a programming language for manacling data stored in relational databases. Object query language consists of a data definition language and a data manipulation language. The scope of object query language includes data insert, query, update and delete, schema creation and modification, and data access control.

In the prior art, there are command languages such as PowerShell which include a query language to access objects within the query language or within the machine it is running on.

Sending commands to many individual virtual machines via APIs such VIM requires a lot of code to filter the calls and requires time to access all of the virtual machines in the environment. For instance, if you want to shut down all virtual machines that are owned by a specific user and running a specific operating system, the process would be to write code to walk through a central repository of information to determine those factors around each and every virtual machine, then send the commands to each of those virtual machines.

What is needed is a process to combine the filtering and the processing into a command structure that would allow administrators to easily manage these large systems based on various filter criteria.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 10 depicts an example in the prior art of the pseudo code needed to shut down one or more virtual machines that are running Ubuntu 12.04 in a specific environment.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms and variation of such terms such as "generates", "queries", "compares", "updates", "receives", "initiates", "monitoring", "updating", "sends", "maintains", "selects", or the like, often refer to the actions and processes of an electronic computing device (or portion thereof), module or system, such as, but not limited to, a virtual infrastructure manager 1000 (See FIGS. 10 and 11), unless noted otherwise. The electronic computing device/module/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Embodiments and Discussion

Figure 1:
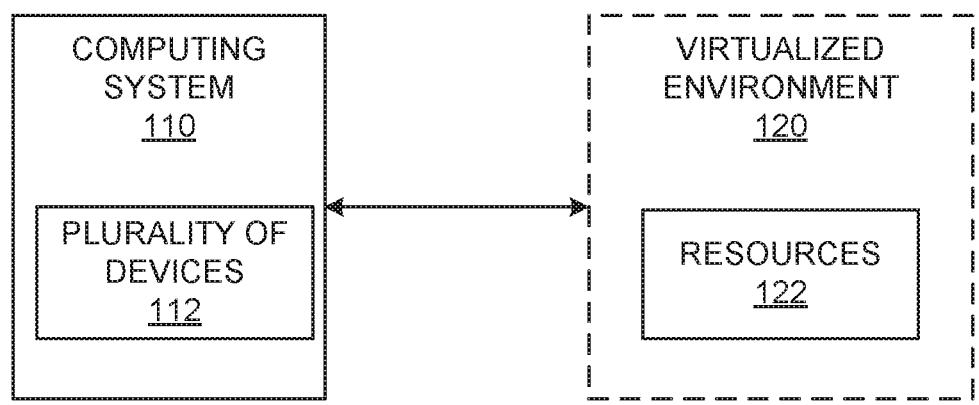
FIG. 1 depicts a block diagram of a virtual computing environment, according to various embodiments.

FIG. 1 depicts a block diagram that illustrates virtual computing environment (VCE) 100 (or virtualization infrastructure) that includes computing system 110 and virtualized environment 120, according to various embodiments. In general, computing system 110 and virtualized environment 120 are communicatively coupled over a network such that computing system 110 may access functionality of virtualized environment 120.

As will be described in further detail below, computing system 110 is implemented using virtualized environment 120. Also, while implementing the business functionality, computing system 110 might use some of resources 122.

In one embodiment, computing system 110 may be a system (e.g., enterprise system) or network that includes a combination of computer hardware and software. The corporation or enterprise utilizes the combination of hardware and software to organize and run its operations. To do this, system 110 uses resources 122 because system 110 typically does not have dedicated resources that can be given to the virtualized environment. For example, an enterprise system may provide various computing resource for various needs such as, but not limited to information technology (IT), security, email, etc.

In various embodiments, computing system 110 includes a plurality of devices 112. The devices are any number of physical and/or virtual machines. For example, in one embodiment, computing system 110 is a corporate computing environment that includes tens of thousands of physical and/or virtual machines. It is understood that a virtual machine is implemented in virtualized environment 120 that includes one or some combination of physical computing machines. Virtualized environment 120 provides resources 122, such as storage, memory, servers, CPUs, network switches, etc., that are the underlying hardware infrastructure for VCE 100.

The physical and/or virtual machines may include a variety of operating systems and applications (e.g., operating system, word processing, etc.). The physical and/or virtual machines may have the same installed applications or may have different installed applications or software. The installed software may be one or more software applications from one or more vendors.

Each virtual machine may include a guest operating system and a guest file system. Moreover, the virtual machines may be logically grouped. That is, a subset of virtual machines may be grouped together in a container (e.g., VMware vApp™). For example, three different virtual machines may be implemented for a particular workload. As such, the three different virtual machines are logically grouped together to facilitate in supporting the workload. The virtual machines in the logical group may execute instructions alone and/or in combination (e.g., distributed) with one another. Also, the container of virtual machines and/or individual virtual machines may be controlled by a virtual management system. The virtualization infrastructure may also include a plurality of virtual datacenters. In general, a virtual datacenter is a pool of resources (e.g., memory, CPU, storage). It is understood that a virtual data center is implemented on one or some combination of physical machines.

In various embodiments, computing system 110 may be a cloud environment, built upon a virtualized environment 120. Computing system 110 may be located in an Internet connected datacenter or a private cloud computing center coupled with one or more public and/or private networks. Computing system 110, in one embodiment, typically couples with a virtual or physical entity in a computing environment through a network connection which may be a public network connection, private network connection, or some combination thereof. For example, a user may couple via an Internet connection with computing system 110 by accessing a web page or application presented by computing system 110 at a virtual or physical entity.

As will be described in further detail herein, the virtual machines are hosted by a host computing system. A host includes virtualization software that is installed on top of the hardware platform and supports a virtual machine execution space within which one or more virtual machines may be concurrently instantiated and executed.

In some embodiments, the virtualization software may be a hypervisor (e.g., a VMware ESX™ hypervisor, a VMware ESXi™ hypervisor, etc.) For example, if hypervisor is a VMware ESX™ hypervisor, then virtual functionality of the host is considered a VMware ESX™ server.

Additionally, a hypervisor or virtual machine monitor (VMM) is a piece of computer software, firmware or hardware that creates and runs virtual machines. A computer on which a hypervisor is running one or more virtual machines is defined as a host machine. Each virtual machine is called a guest machine. The hypervisor presents the guest operating systems with a virtual operating platform and manages the execution of the guest operating systems. Additional details regarding embodiments of structure and functionality of a host computer system are provided with respect to FIG. 2.

During use, the virtual machines perform various workloads. For example, the virtual machines perform the workloads based on executing various applications. The virtual machines can perform various workloads separately and/or in combination with one another.

Importantly, the embodiments of the present invention, as will be described below, provide an approach for using an object query language for virtualized infrastructure management which differs significantly from the conventional processes used to manage virtualized infrastructures. In conventional approaches, the management context requires a lot of program knowledge. To manage the virtualized infrastructure a programmer will need to manually define a number of calls into a routine. Such conventional approaches are error prone, tedious, time-consuming, and often fail to support any type of automation for virtualized infrastructure management. Instead, the present embodiments, as will be described and explained below in detail, provide a previously unknown procedure for utilizing an object query language to provide both fetching and command capabilities to the management of virtualized infrastructures without requiring a high level of program knowledge. Thus, embodiments of the present invention provide a managed virtualized infrastructure which extends well beyond what was previously done and provides significant improvement to the management of a virtualized infrastructure.

As will be described in detail, the various embodiments of the present invention do not merely implement conventional processes used to manage virtualized infrastructures. Instead, the various embodiments of the present invention, in part, provide a previously unknown procedure for using an object query language for virtualized infrastructure, in combination with a newly derived fetching and command capabilities to provide an object query language for virtualized infrastructure management. Hence, embodiments of the present invention provide a novel process for using an object query language for virtualized infrastructure management.

Moreover, the embodiments do not recite a mathematical algorithm; nor do they recite a fundamental economic or longstanding commercial practice. Instead, they address a management of virtualized infrastructure challenge. Thus, the embodiments do not "merely recite the performance of some business practice known from the pre-Internet world along with the requirement to perform it on the Internet. Instead, the embodiments are necessarily rooted in virtualized infrastructure in order to overcome a problem specifically arising in the realm of virtualized infrastructure management.

Example Host Computer System

Figure 2:
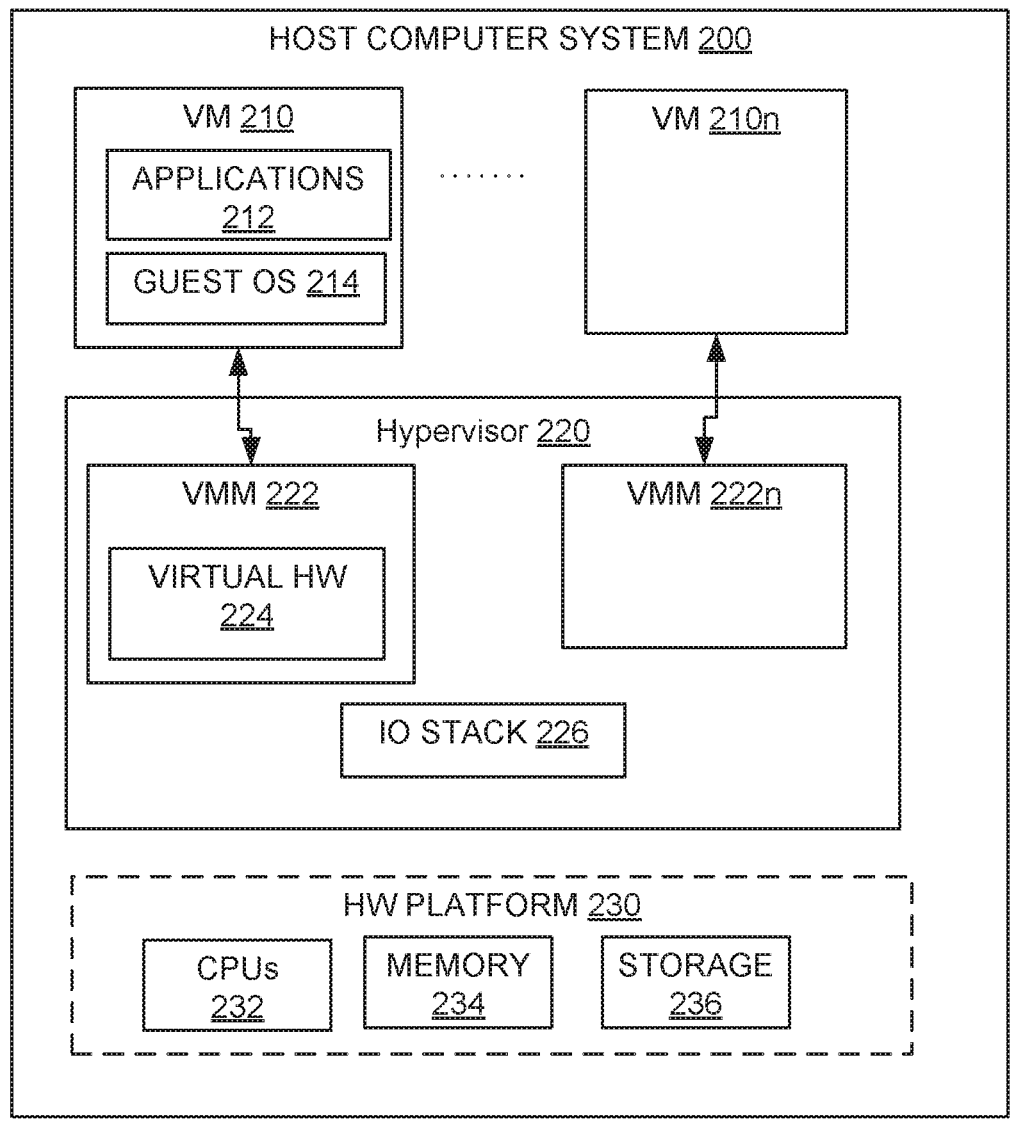
FIG. 2 depicts a block diagram of a host computing system, according to various embodiments.

FIG. 2 is a schematic diagram that illustrates a virtualized computer system that is configured to carry out one embodiment of the present invention. The virtualized computer system is implemented in a host computer system 200 including hardware platform 230. In one embodiment, host computer system 200 is constructed on a conventional, typically server-class, hardware platform.

Hardware platform 230 includes one or more central processing units (CPUs) 232, system memory 234, and storage 236. Hardware platform 230 may also include one or more network interface controllers (NICs) that connect host computer system 200 to a network, and one or more host bus adapters (HBAs) that connect host computer system 200 to a persistent storage unit.

Hypervisor 220 is installed on top of hardware platform 230 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 224 for virtual machine 210 supports the installation of guest OS 214 which is capable of executing applications 212 within virtual machine 210.

Guest OS 214 may be any of the well-known commodity operating systems, and includes a native file system layer, for example, either an NTFS or an ext3FS type file system layer. IOs issued by guest OS 214 through the native file system layer appear to guest OS 214 as being routed to one or more virtual disks provisioned for virtual machine 210 for final execution, but such IOs are, in reality, reprocessed by IO stack 226 of hypervisor 220 and the reprocessed IOs are issued, for example, through an HBA to a storage system.

Virtual machine monitor (VMM) 222 and 222n may be considered separate virtualization components between the virtual machines and hypervisor 220 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Examples of an Appliance

Figure 3:
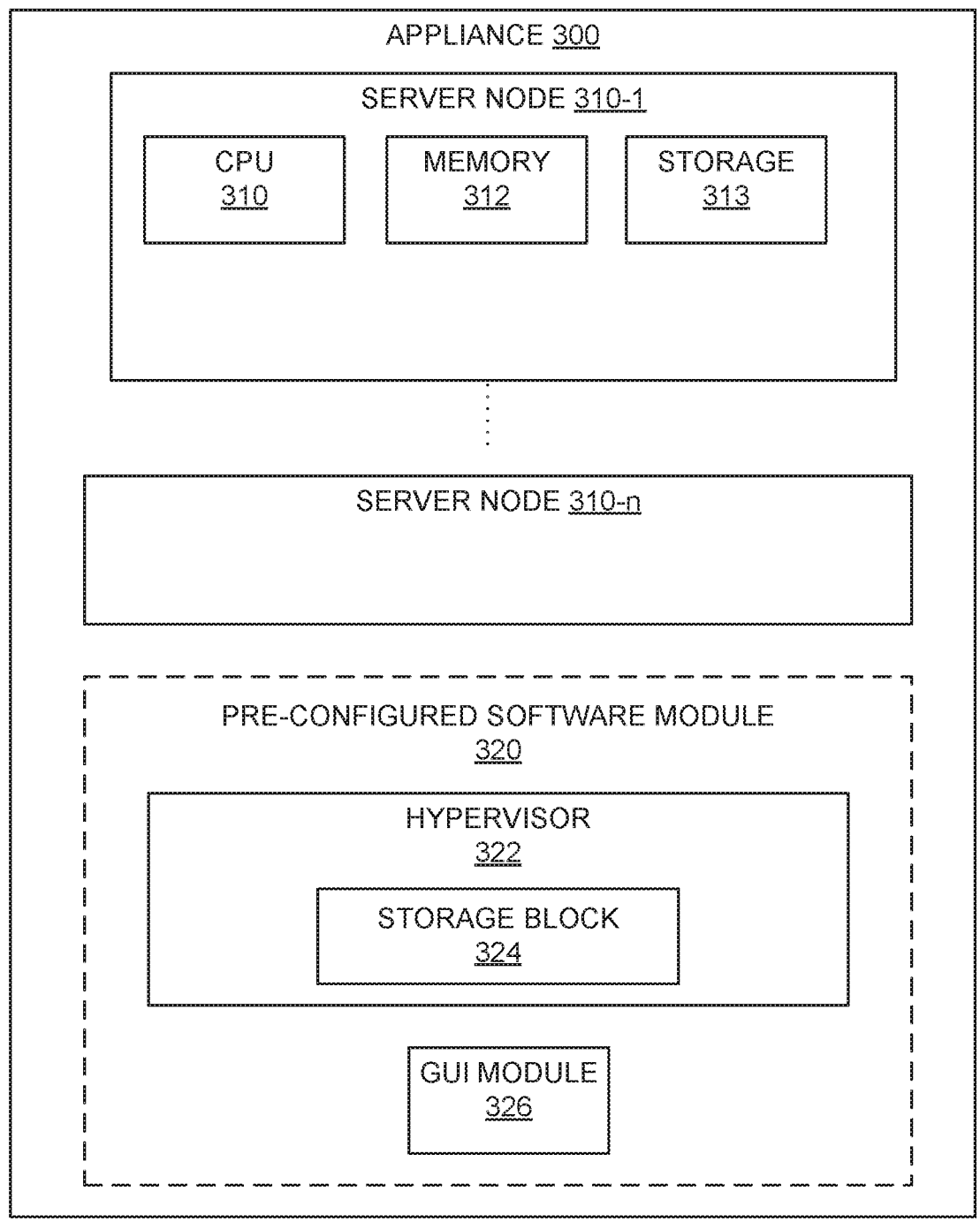
FIG. 3 depicts a block diagram of an appliance, according to various embodiments.

FIG. 3 depicts an embodiment of appliance 300. Appliance 300 is a computing device that includes the requisite physical hardware and software to create and manage a virtualization infrastructure. Appliance 300 is also referred to herein as a pre-configured hyper-converged computing device. In general, a hyper-converged computing device includes pretested, pre-configured and pre-integrated storage, server and network components, including software, that are located in an enclosure. Moreover, the hyper-converged computing device includes a hypervisor that supports a virtualization infrastructure.

Based on the pre-configured hardware and software disposed within appliance 300, appliance 300 enables a user to simply and quickly create a virtualization infrastructure and deploy virtual machines shortly after the appliance is powered on for the first time.

Appliance 300 includes, among other things, at least one server node. For example, server nodes 310-1 through server node 310-n. Server node 310-1 includes a central processing unit (CPU) 311, memory 312, and storage 313. It should be appreciated that other server nodes (i.e., server node 310-n) each include a CPU, memory, and storage similar to server node 310-n.

Appliance 300 is scalable. That is appliance can be scaled to include more than one server node. For example, appliance 300 can initially have a single server node. However, additional server nodes may be included in appliance 300.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Moreover, each server node may be considered a server or host computing system. That is, each server node is able to independently host a number of virtual machines. For example, server node 310-1 is able to host a first set of virtual machines; while other server nodes are each able to independently host other sets of virtual machines, respectively.

The server nodes are independent of one another, and are not required to share any functionality with one another. Appliance 300 does not include a backplane. As such, the server nodes are isolated from one another and therefore independent of one another.

CPU 311 may be, but is not limited to, a dual socket CPU (e.g., Intel Xeon™ CPUs, 4-core to 6-core).

Memory 312 may be, but is not limited to, 128 gigabytes (GB).

Storage may be, but is not limited to, three drive slots per node. Such as a solid state drive (SSD) (e.g., an SSD of 800 GB), and two hard disk drives (HDD) (e.g., HDDs of 8 terabytes (TB)).

Additionally, the appliance may include various external interfaces, such as but not limited to, serial, network RJ-45 (10000 NIC), graphics, management RJ-45 (100/10000 NIC), power (in front and in rear), UID (in front and in rear) and a USB.

The appliance may also include Component Interconnect Express (PCIe) expansion slots, and a disk controller with pass through capabilities. It should be appreciated that the appliance may include other hardware attributes that are compatible with supporting a virtualization infrastructure.

In one embodiment, appliance 300 is a rackable 2U/4Node appliance. That is, appliance 300 is two rack units in height and includes four server nodes (e.g., server nodes 310-1 through 310-n).

The size of a piece of rack-mounted equipment is described as a number in "U" or "RU" (rack unit). One rack unit is often referred to as "1U", 2 rack units as "2U" and so on. "U" is a unit of measure that describes the height of equipment designed to mount in a rack (e.g., 19-inch rack or a 23-inch rack). The 19-inch (482.6 mm) or 23-inch (584.2 mm) dimension refers to the width of the equipment mounting frame in the rack including the frame. In some instances, one rack unit is 1.75 inches (4.445 cm) high.

In another embodiment, appliance 300 is a 4U/4Node appliance. That is, appliance 300 is four rack units in height and includes 4 server nodes (e.g., server nodes 310-1 through 310-*n*).

Appliance 300 includes software to support a virtualization infrastructure. That is, appliance 300 includes code or instructions stored on physical hardware in appliance 300, that when executed by a processor, supports a virtualization infrastructure. For instance, appliance 300 includes object query language module 320.

It should be appreciated that the software installed on appliance 300 (e.g., software module 320) is stored in a storage device. In various embodiments, the software may be installed in a single server node or may be distributed in various server nodes. In another embodiment, the software may be stored in a storage device within appliance 300 but is outside of the server nodes.

During operation of the appliance, the software may be executed by one or more CPUs in a single server node or the execution may be distributed amongst various CPUs in various server nodes.

Software module 320 includes, among other things, hypervisor 322. As described above, a hypervisor is installed on top of hardware platform (e.g., CPU, memory and storage) and supports a virtual machine execution space within which one or more virtual machines (VMs) may be concurrently instantiated and executed.

In various embodiments, hypervisor 322 is VMware ESX™ hypervisor or a VMware ESXi™ hypervisor. It is noted that "ESX" is derived from the term "Elastic Sky X" coined by VMware™.

It should be appreciated that software module 320, in one embodiment, includes a suite of software tools for cloud computing (e.g., VMware vSphere™, VCenter™) that utilizes various components such as a VMware ESX/ESXi hypervisor.

Software module 320, in one embodiment, includes a centralized management tool for an appliance or a cluster of appliances, which will be described in further detail below. The centralized management tool, in one embodiment, is for the management of multiple ESX hosts and virtual machines (VMs) from different ESX hosts through a single console application. It should be appreciated that the virtualization infrastructure, or portions of the virtualization infrastructure may be managed by the centralized management tool via a user interface.

Software module 320 includes storage block 324. Storage block 324 is a logical partition of storage (e.g., storage 313) in appliance 300. In other words, storage block 324 is virtual storage. In one embodiment, storage block 314 is a virtual storage area network (VSAN). As a result, the VSAN allows traffic to be isolated within specific portions of a storage area network.

Storage block 324 is imbedded or integral with hypervisor 322. In other words, the data path for storage is in the hypervisor layer.

Various advantages occur due to the storage block integrated with the hypervisor. In one example, the VSAN communicates with the ESX layer at a kernel level and is not required to communicate over a network via an Ethernet connection. As such, communication latency between the storage block and hypervisor is reduced.

GUI module 326 is code or instructions that enable the utilization of a graphical user interface to creating and managing appliances (e.g., ESX hosts) and virtual machines of the virtualization infrastructure. The graphical user interface is described in further detail below.

It is noted that software module 320 is proprietary software of a single entity (e.g., VMware™). For example, hypervisor 322, storage block 324, and GUI module 326 are proprietary software code to a single entity. That is, hypervisor 322, storage block 324, and GUI module 326 are not open source code, and therefore require a license agreement between the licensor (e.g., VMware™) and a purchaser of the appliance that includes the proprietary software module. In one embodiment, the license agreement is an end-user license agreement (EULA). The EULA establishes the purchaser's right to use the software (e.g., software module 320) and the hardware of appliance 300.

Figure 4:
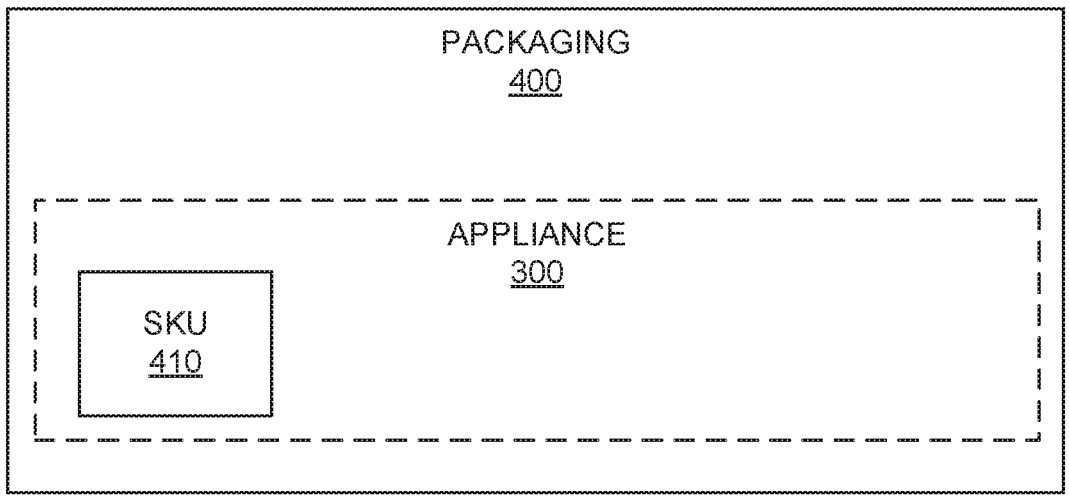
FIG. 4 depicts a block diagram of a side-view of an appliance offered for sale, according to various embodiments.

FIG. 4 depicts an embodiment of a side-view of an appliance offered for sale. In one embodiment, appliance 300 is offered for sale as a single stock keeping unit (SKU). For example, appliance 300 is disposed in packaging 400 and SKU 410 is on packaging 400. Accordingly, appliance 300 is offered for sale as a single SKU.

More specifically, appliance 300, as described herein, is pre-configured with the requisite hardware and software for employing a virtualization infrastructure. Therefore, subsequent the purchase of appliance 300 as a single SKU, appliance 300 is not required to include any additional hardware and/or software to support and manage a virtualization infrastructure.

Upon powering on appliance 300 for the first time, a single EULA is displayed to an end-user. Because software module 320 is proprietary to a single entity (e.g., VMware™), only a single EULA, provided by the single entity, is displayed to the purchasing end-user. More specifically, at least hypervisor 322 (e.g., ESX/ESXi hypervisor) and storage block 324 (e.g., VSAN) are proprietary to a single entity (e.g., VMware™). Therefore, only a single EULA pertaining to hypervisor 322 and storage block 324 is displayed and provided to an end-user.

Upon acceptance of the EULA, appliance 300 is enabled to operate and manage a virtualization infrastructure, and deploy virtual machines in the virtualization infrastructure.

It should be appreciated that upon first powering on appliance 300 and accepting the single EULA, a virtualization infrastructure is able to be rapidly created and a virtual machine is able to be deployed within the virtualization infrastructure within minutes (e.g., 15 minutes). Moreover, the virtualization infrastructure is able to be managed and controlled by an end-user that is not required to have high-level IT administrative training and experience.

In one embodiment, appliance 300 is able to deploy a plurality of virtual machines in the virtualization infrastructure. For example, based on the hardware and software incorporated in appliance 300, appliance 300 is able to deploy pre-set number of virtual machines (e.g., 75 virtual machines, 150 virtual machines, etc.).

Figure 5:
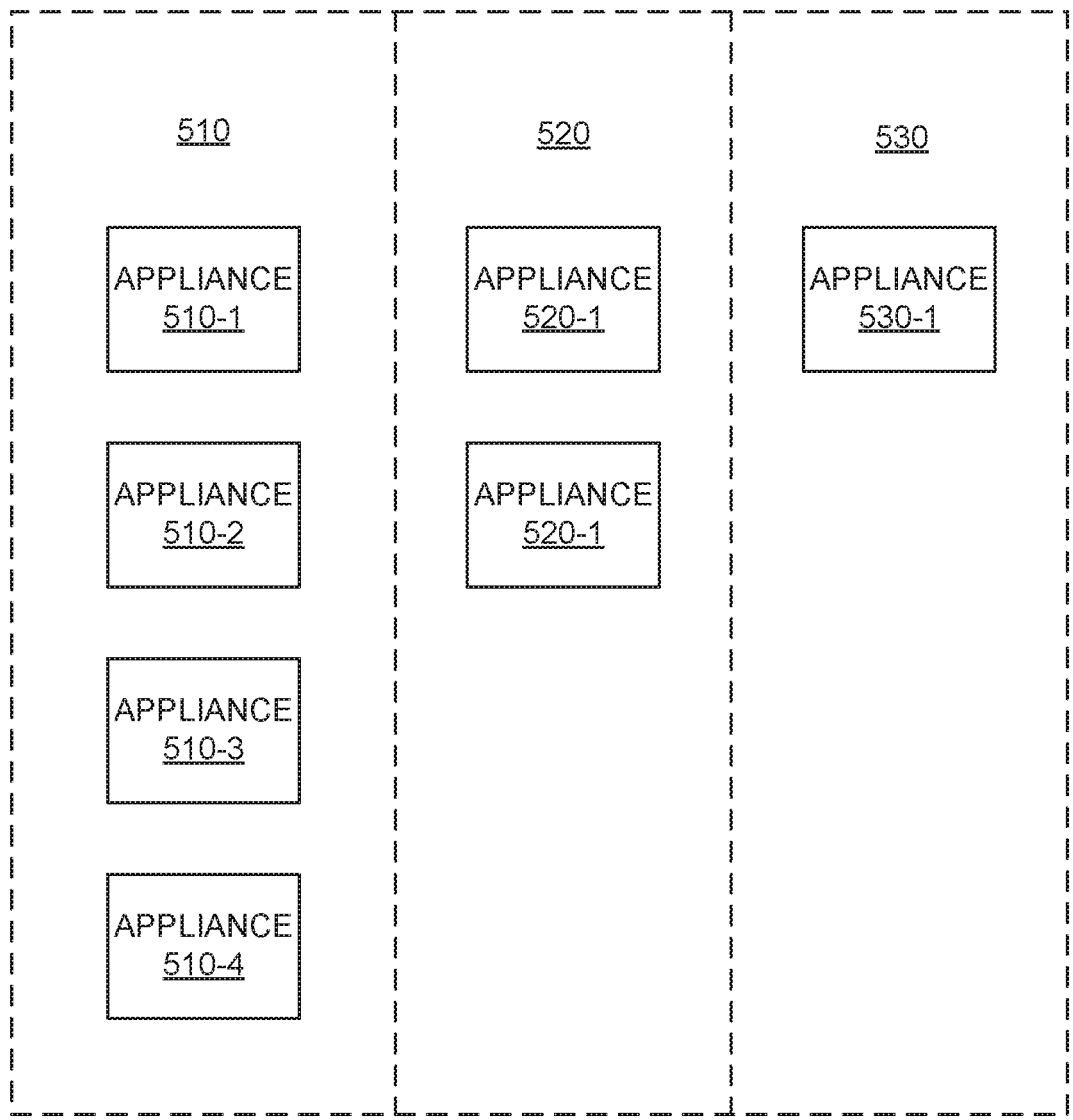
FIG. 5 depicts a block diagram of a virtualization infrastructure, according to various embodiments.

FIG. 5 depicts an embodiment of various appliances supporting virtualization infrastructure 500.

In one embodiment, appliances may be grouped together to increase the functionality of creating and managing a virtualization infrastructure. For example, appliance 510-1 was initially utilized to deploy a plurality of virtual machines, at location 510. However, additional virtual machines were desired but appliance 510-1, alone, was not able to meet the demand for the desired additional virtual machines. As such, additional appliances 510-2, 510-3, and 510-4 were purchased and grouped together to meet the demand of the additional virtual machines. In particular, the cluster of appliances which are communicatively coupled together, act as a single platform for managing the virtualization infrastructure and deploying virtual machines.

Similarly, appliance 520-1 was initially utilized to deploy a plurality of virtual machines, at location 520. However, additional virtual machines were desired but appliance 520-1, alone, was not able to meet the demand for the desired additional virtual machines. As such, additional appliance 520-2 was purchased and grouped together with appliance 520-1 to meet the demand of the additional virtual machines.

It should be appreciated that any number of appliances may be grouped together. For example, two, three, four, five or more appliances may be grouped together provided that the functionality of the appliances, as a whole, are able to act as a single platform for managing the virtualization infrastructure.

Additionally, the appliances and/or clusters of appliances may be located at various locations. For example, a first cluster of appliances may be located at a main office of an enterprise, while a second cluster of appliances are located at a remote office/branch office (ROBO).

In another example, virtualization infrastructure 500 is a virtualization infrastructure of a large enterprise having various building and infrastructure at various geo-locations. In such an example, information technology (IT) is located at a first location (e.g., location 510), an engineering team is located at a second location (e.g., location 520) and sales team is located at location 530.

Accordingly, appliances 510-1 through 510-4 may be grouped together at a first location 510 to support the demand for virtual machines of the IT team, appliances 510-1 and 510-2 are grouped together at location 520 to support the demand of virtual machines for the engineering team, and appliance 530-1 is located at location 530 to support the demand of virtual machines for the sales team.

GUI module 326 enables a GUI to facilitate the creating and managing of hosts and virtual machines. Moreover, the GUI is able to facilitate in managing the virtualization infrastructure by displaying the attributes of the appliances. For example, the GUI would display the particular health, resources used, and the like, for each of the appliances in virtualization infrastructure 500.

A source of truth is a data source that stores specific data objects which are the resolution to information requirements on one or more other systems.

A defined relational model defines how users interact with their environment based on user permissions. Sources of truth contribute to the defined relational model. Sources of truth update the model for each login user. In one or more embodiment, the defined relational model consists of tables in memory containing lists of objects. Changes are triggered by various processes such as property collectors, database changes, or messages received from other nodes on the network.

In one embodiment, data is received from disparate sources and, depending on user permissions; they will be added to the defined relational model. For instance, a user can see just his username, or one appliance, all appliances in a LAN, all appliances across the WAN associated with some key value/function, etc. Could be services, specific VMs, etc.

In one embodiment, the same or similar data can be provided by several providers. Some data is duplicated, other data is overlapped. For instance, a network broadcast protocol could give you a list of active VMs, while a virtual system manager (e.g. management application 1202 of FIG. 12) like vCenter would give you all VMs and nodes, whether active or not.

In one embodiment, a set of rules are defined to deduplicate the data. For instance, if the same data comes from vCenter or a broadcast protocol, take the data from vCenter.

For example, a node managing other nodes is the source of truth for the DNS addresses of all nodes it is managing. However if a node is not managed by another node, it is its own source of truth for its DNS address.

A cluster is a formal model where a cluster contains one or more nodes. A node is a single or group of computers that share a common model.

In one embodiment, getting or setting information in the model triggers events to a source of truth.

Figure 6:
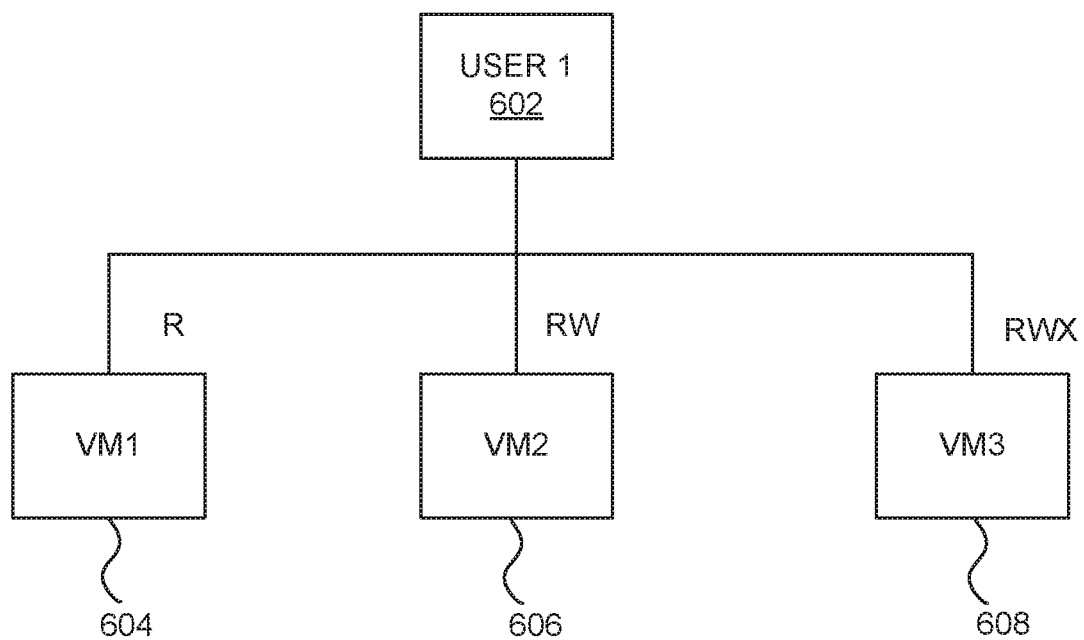
FIG. 6 depicts an example of a defined relational model.

For an example of a defined relational model and operations on it, refer to FIG. 6. This user 602 has access to three virtual machines. For VM1 604 he can only view the information associated with it. For VM2 606 he can update values on the VM but not perform operations on it. For VM3 608 he can update values and perform operations on it. For example, in the case of VM1 604 a user may view the memory and disk footprint but not change it. In the case of VM2 606 a user may view and alter the memory footprint but not shut down the system. In the case of VM3 608 a user may alter the attributes of the VM and shut it down.

The user also has a model associated with it. For example, a user has a username, role and set or privileges that are read only. A user may change his or her authentication information.

A source of truth for information about a VM can be any system entity that captures the latest information about the VM, which could be the VM itself, or the host that manages it or the application that manages the host. Each may have access to different sets of data about the VM so not all of the VM information may come from one source. For instance, a VM may be aware of how much disk and memory it is using, but only the application managing it may know how much it has allocated for growth and what the threshold is for triggering growth or shrinking resources.

In order to avoid getting information from multiple sources, rules must be setup to handle conflicts in one embodiment. For each data object there will be one primary source of truth. However, if that source of truth is not available, then the rules may enable an alternate source if such is available, in one or more embodiment.

In one embodiment, whenever a change is detected by a source of truth, that information may be sent out on the network. Included in that information will be an identifier associated with the data being updated, an identifier associated with the source of truth, and a timestamp. Once the change is detected, in one embodiment, the change needs to be broadcast to all users who need to know this change.

A change occurs directly if a user or process changes data directly. A change occurs indirectly if an operation is performed that has side effects. When a change occurs directly, then the request for the change can be captured and the source of truth updated in one embodiment. When an operation occurs, in one embodiment, one or more triggers must be setup to capture changes in the object or objects affected by the operation.

In one embodiment, the change is broadcast to all nodes on request. In other embodiments, a gossip protocol is used to communicate the changes. In one embodiment, nodes are selected at random to pass on a change received from another node, or a change initiated by a user on a particular node.

In one embodiment, each node would have a source of truth process which accepts updated information from each other node, stores the data associated with the latest timestamp of that information. In other embodiments, the source of truth process further filters the information for each user based on the rules setup for that user. Further, the source of truth process may broadcast changes to any data object to the source of truth associated with that data object.

Figure 7:
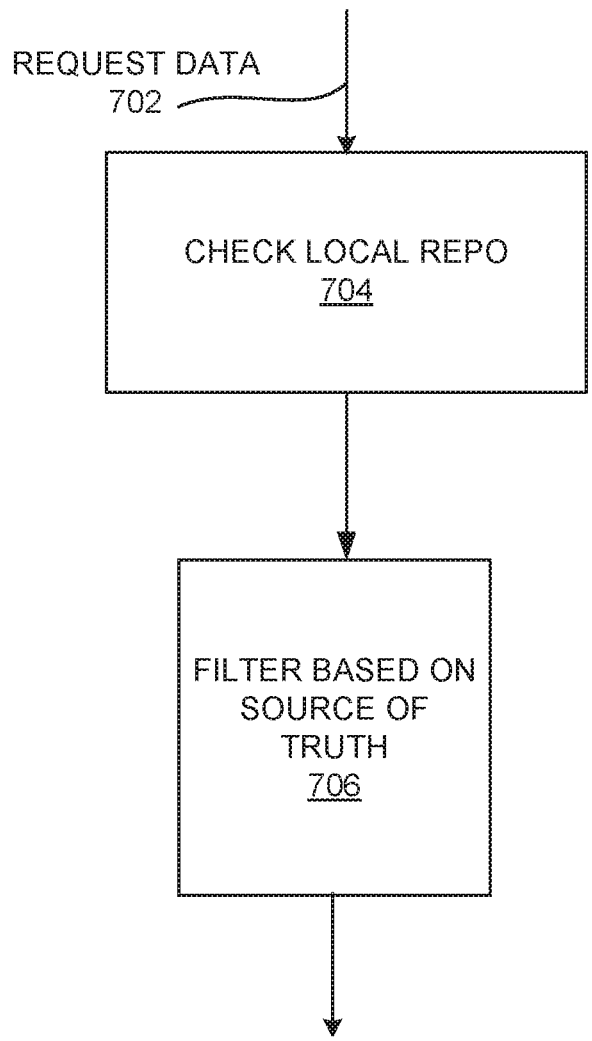
FIG. 7 shows a workflow for one embodiment of how an application on a node would request data to update the defined model.

FIG. 7 shows a workflow for one embodiment of how an application on a node would request data to update the defined model. The application managing the model would request a data value 702. The local repository would be checked to see what value or values it has associated with the data 704. The data would vary based on timestamp and source of truth. Rules would be in place to filter the data to one value or set of values 706 which would then be returned to the requester to update the model.

Figure 8:
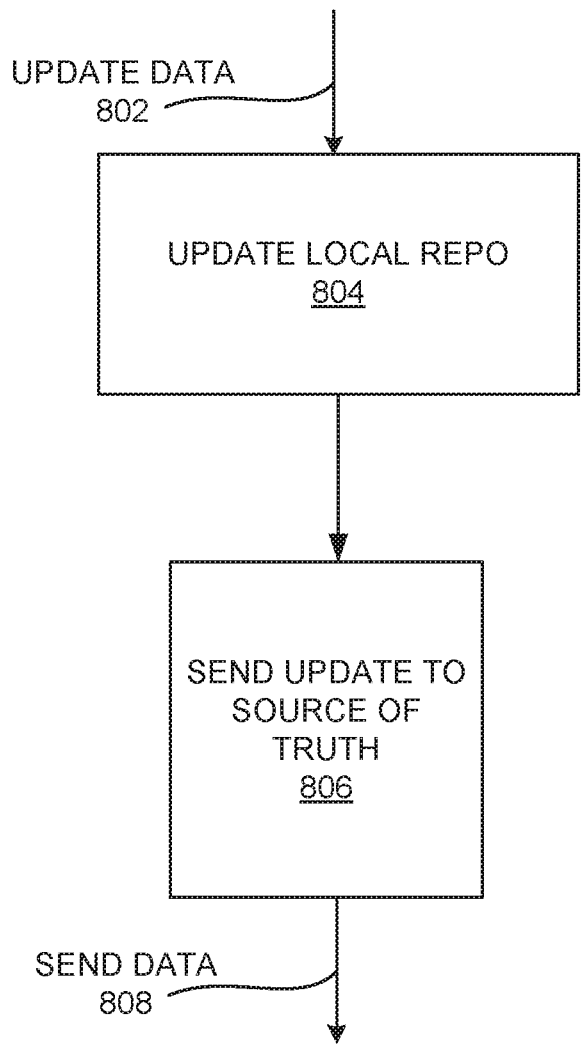
FIG. 8 shows a workflow for one embodiment of how an application on a node would update data.

FIG. 8 shows a workflow for one embodiment of how an application on a node would update data. When an application running on a node acts to update data in the defined model 802, it can update the local repository 804 marks the data object as dirty; in this way, there is an opening for any official source of truth to overwrite it once it sends data back to the node. Once this is done, the source of truth process can determine what node and service is the source of truth for this data 806, and sends the update to that service 808. In other embodiments, the data would be broadcast to the source of truth that would then perform an update on the data object in the model, and return the data either on query or when otherwise appropriate.

Figure 9:
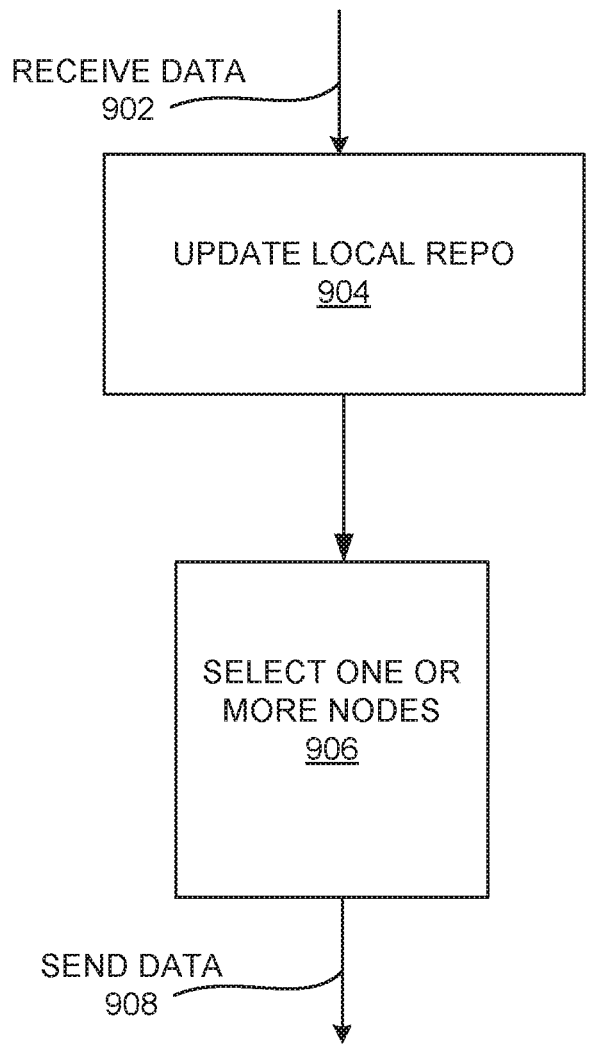
FIG. 9 shows a workflow for one embodiment of how an application on a node would process received data.

FIG. 9 shows a workflow for one embodiment of how a source of truth would process received data. When a source of truth receives a data object from a node 902, the source of truth process updates the local repository 904. If there is data from the same source with an earlier timestamp, the data is replaced. In one embodiment, the source of truth then participates in the protocol by selecting one or more nodes at random to retransmit the data to 906, and sends the data on to those nodes 908.

In one embodiment, a virtual machine has various attributes that are tracked by a central repository, managed by sources of truth. Extending an API call such as "vm.restart ( )" with a query language associated with the object model of the virtual machine enables a user to rapidly control groups of related virtual machines. The concept of the object model is supported based on mining of the central repository (e.g., by owner, by operating system, by current state).

In one embodiment, the central repository is queried using an API to retrieve the objects to operate on and, in turn query each one of the objects based on the native object model of the virtual infrastructure.

For example, an example of typical API code to perform a restart against a group of virtual machines running Ubuntu 12.04 is shown in FIG. 10. This code could be translated to the following: vm.restart( ) where vm.os is "Ubuntu 12.04".

Figure 11:
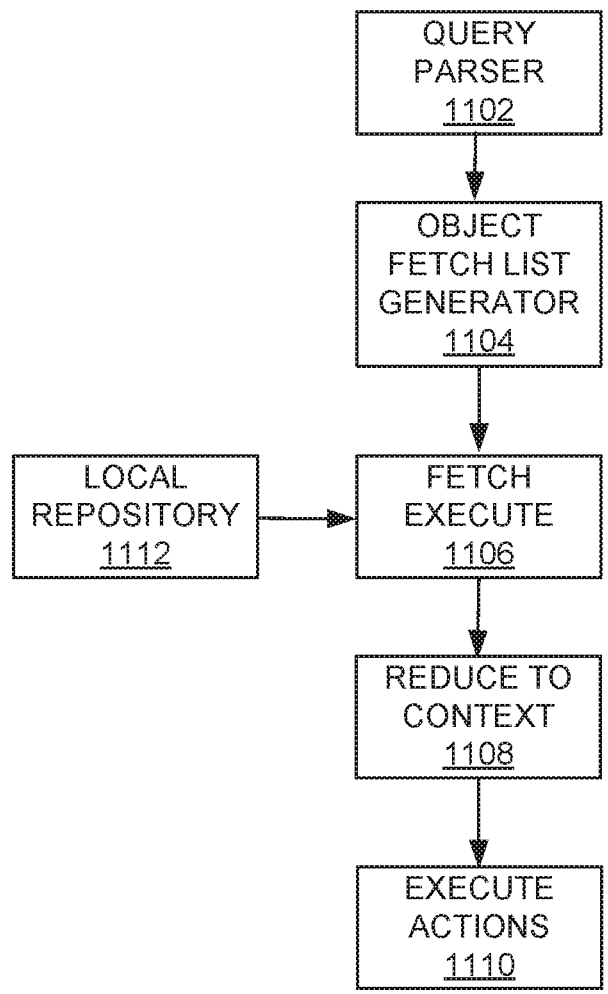
FIG. 11 is a flow chart of processes performed in accordance with an embodiment of the present invention.

One embodiment of this would be a pre-processor that would accept each command and convert it to the associated API calls as shown in FIG. 11. A parser 1102 would accept the commands and separate the API calls to be executed from the query. In one embodiment, the parser 702 could accept a sequence of one or more API calls separated by a common separator such as a semi-colon or a line break, followed by a query.

In one embodiment, once the parser has separated the commands from the query, the query can be converted directly to API commands to retrieve the objects needed for the query as shown in FIG. 10. In one embodiment, the query could be executed as a map-reduce process as follows. First parse the query to determine what kind of objects are needed (Virtual Machine, host, for example) and query each object in the system to get all of the required fields. Then, using a map reduce algorithm, send out all of the data to be filtered appropriately to various servers and return values to combine the result.

One embodiment of the implementation of the invention is shown in the flow chart of FIG. 11. The Query Parser Module 1102 accepts a command string and performs tokenization on the command string. Tokenization is performed on a query to produce a Syntax Tree. In one embodiment, each part of the query is placed into the Syntax Tree such that walking the tree could completely re-create the query.

In one embodiment, the Object Fetch List Generator 1104 generates one or more lists to retrieve objects into.

For example, the query vm.host.PowerDown_Task ("param1", "param2") ON VirtualMachine vm, HostMachine host WHERE vm.runtime.host=host, host.name="Hello World" might have the following tree:

```
Action:
    Type: execute method
    Object: vm.host
    Method: PowerDown_Task
    Parameters
        Parameter: "param1"
        Parameter: "param2"
Bindings
    Object Retrievals
        Retrieval
            Type: VirtualMachine
            Alias: vm
        Retrieval:
            Type: HostMachine
            Alias: host
    Object Selections
        Selection
            LHS: vm.runtime.host
            RHS: host
        Selection
            LHS: host.name
            RHS: "Hello World"
```

In the above example, there are two lists, one for each object retrieved. The first list is associated with the VirtualMachine type object named "vm", and it will be a list of the values "vm.runtime.host" associated with those objects. The second object will be HostMachine object named host, and that will retrieve the list of values "host.name" associated with those objects.

In one embodiment, the second object is a list of values associated with one or more attributes of the object required to resolve the query. One of those attributes could be a reference to the entire object.

Further, each object tree will have a filter value associated with it for post-fetch processing. In the first list it is the value of the host object, in the second list it is the string "Hello World"

In one embodiment, the Fetch Execute Module 1106 will perform the fetch to get all of the objects and the values associated with them, as defined by the Query Parser Module 1102. The result is added to the Fetch List as defined in the Object Fetch List Generator Module 1104. In one embodiment, the defined relational model is searched for the objects using the Local Repository 1112 to determine how to retrieve the objects from the network.

In one embodiment, Reduce to Context Module 1108 operates on the lists created by the Object Fetch List Generator Module 1104. After the query is completed by the Fetch Execute Module 1106, the data is filtered based on the object selections and those that don't match the criteria are removed from the list.

In one embodiment, once the list has been pared down by the Reduce to Context Module 1108, the Execute Actions Module 1110 executes the action on each remaining object. In one embodiment this is done in parallel, in other embodiments serially. When all of the actions have completed or timed out, the user is sent a response detailing the objects executed and their responses. In one embodiment, the user can set a parameter on the execution such that if any failures occur, the remaining actions are stopped or cancelled and the partial response is sent back to the user.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave, data signal, or other transport mechanism and includes any information delivery media. The term "modulated data signal" and "carrier-wave signal" includes a signal that has one or more of its characteristics set or changed in such a manner as to encode information, instructions, data, and the like, in the signal.

In one embodiment, programming instructions for executing above described methods and systems are provided. The programming instructions are stored in a computer readable media.

With the above embodiments in mind, it should be understood that one embodiment of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of one embodiment of the invention are useful machine operations. One embodiment of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

One embodiment of the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a network.

One embodiment of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Figure 12:
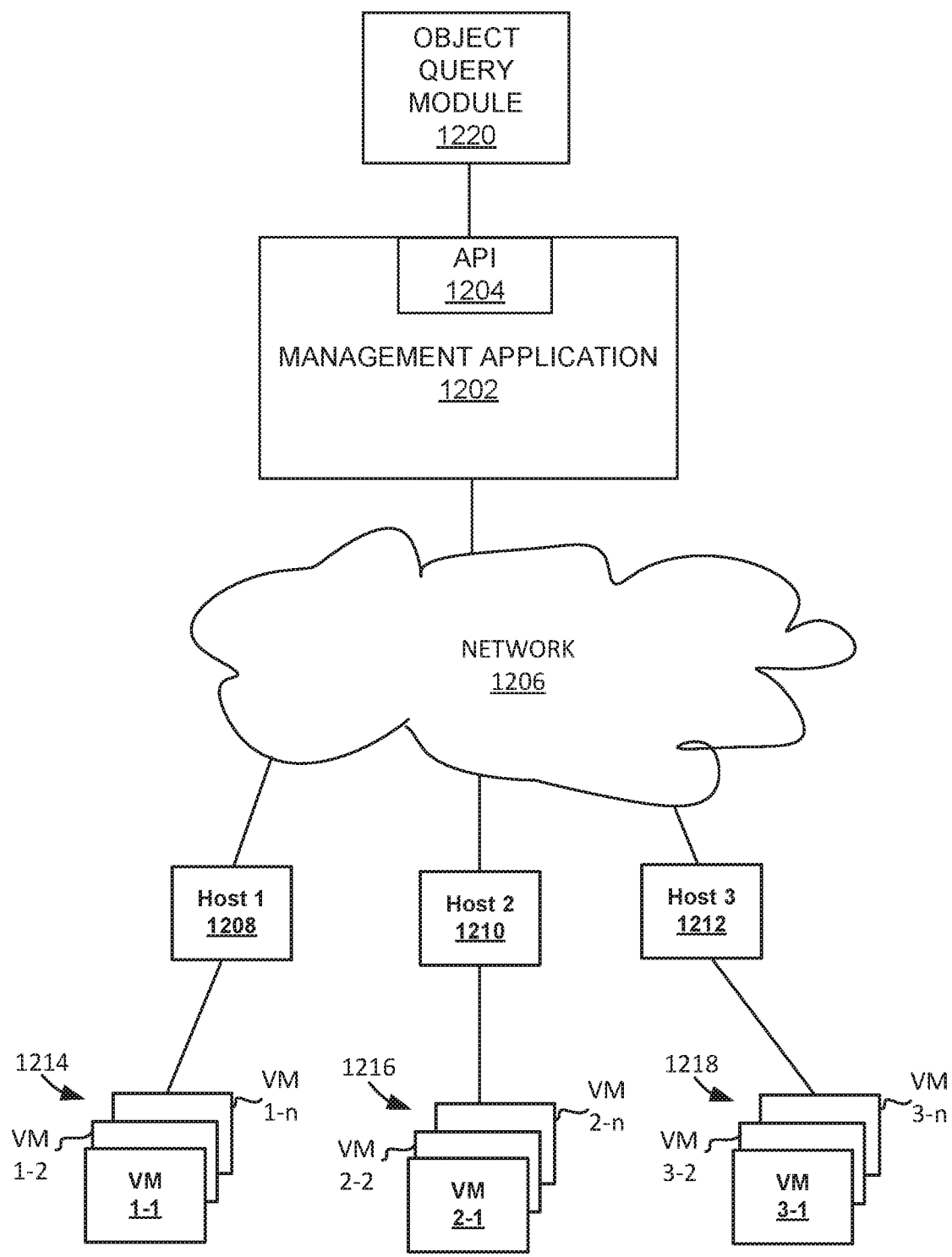
FIG. 12 is a schematic diagram of one embodiment in accordance with the present invention.

Referring now to FIG. 12, a schematic diagram of one embodiment in accordance with the present invention is shown. As shown in FIG. 12 a management application 1202 (such as, for example, a VCenter™ application or other centralized management tool) is used to monitor and manage a plurality of host machines typically shown as Hosts 1208, 1210 and 1212. In one embodiment communication between management application 1202 and Hosts 1208, 1210 and 1212 is accomplished via a network 1206 such as, for example a cloud.

As depicted in FIG. 12, host 1208 has virtual machines 1214 associated therewith (e.g. Vm1-1 through Vm1-n). Similarly, host 1210 has virtual machines 1216 associated therewith (e.g. Vm2-1 through Vm2-n), and host 1212 has virtual machines 1218 associated therewith (e.g. Vm3-1 through Vm3-n).

As shown in FIG. 12, an object query module 1220 is used to ultimately provide for 1) query and parsing of information regarding the virtual machines 1214-1218; 2) fetching of data from virtual machines 1214-1218; 3) reduction of data collected from virtual machines 1214-1218; and 4) providing commands to virtual machines 1214-1218. In various embodiments, query object module 1220 is coupled with management application 1202 via APIs 1204 of management application 1202. In other embodiments, query object module 1220 is fully integrated with management application 1202.

In general, fetching, e.g., fetch execute 1106, refers to working out what class of objects to interrogate. For example, if the object query module 1220 is outside of the management application 1202, object query module 1220 would work out that the query is referencing virtual machines and hosts, therefore the object query module 1220 would only be concerned with fetching information about virtual machines 1214-1218 and hosts 1208-1212.

In one embodiment, in the first instance object query module 1220 would fetch all virtual machines and all hosts information and store it locally to a local database, such as local repository 1112 so that object query module 1220 could then do the actual query processing in a faster manner. In other words, like a caching process. Although, in one embodiment, that does lend itself to fetching a lot of stuff and processing after, as such, the fetching and storage would be distributed to reduce resource strain.

After the information is stored locally, in one embodiment a reduction, e.g., reduce to context 1108, is performed to reduce the information down to what is actually desired, e.g., winnowing down from the fetching all the stuff to the focus on only what is being searched for. E.g., all virtual machines having a host with the name " . . . ", all virtual machines with a build date, all hosts with a build date, all virtual machines with a last update timeframe, all hosts with a last update timeframe within a-b, and the like. Basically, the reduction can be down to as much detail as is necessary to obtain the appropriate subclass of devices.

In general, the reduction results in a binding set of what's returned (e.g., virtual machines and hosts) where the query binds them together. For example, if the reduction were selecting virtual machines where the hosts name is "such and such" the binding would be the virtual machines and hosts where the predicate is true.

In one embodiment, the command, e.g., execute actions 1110, is called on any or all of the objects that have been returned. For example, the command could be called on each VM and hosts that are in the binding. In general, the commands can include actions such as, show me data on the device, show me data about the device build, hosts-power off/power on, virtual machines-turn on, shut down, and the like.

For example, in one embodiment, the command parsing process is configured to accept the command, parse the command into one or more actions and a query, store the one or more actions into the storage, and send the query to the query processor.

In one embodiment, the query parsing process is configured to accept the query, and parse the query into the object, parameters and filters.

In one embodiment, the query execution process is configured to use the local repository to access all of the objects in the system of the object type, get all of the required attributes associated with each object, filter the objects according to the filters.

In one embodiment, the action execution process is configured to accept each object returned from the query execution process, and operate on each object according the sequence of sequential methods.

Example Computer System

Figure 13:
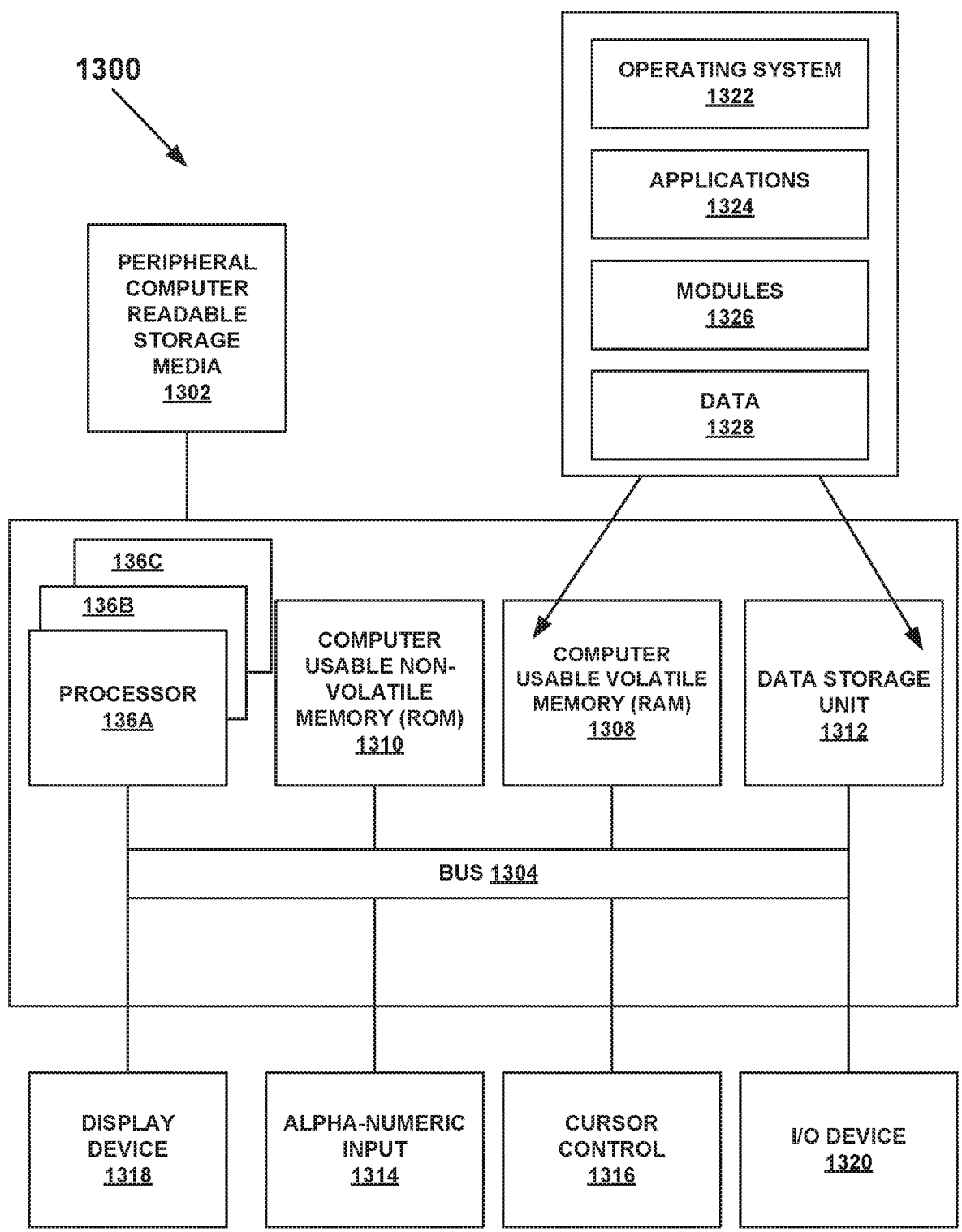
FIG. 13 is a block diagram of an example computer system with which or upon which various embodiments of the present invention may be implemented.

With reference now to FIG. 13, all or portions of some embodiments described herein are composed of computer-readable and computer-executable instructions that reside, for example, in computer-usable/computer-readable storage media of a computer system. That is, FIG. 13 illustrates one example of a type of computer (computer system 1300) that can be used in accordance with or to implement various embodiments which are discussed herein. It is appreciated that computer system 1300 of FIG. 13 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, distributed computer systems, media centers, handheld computer systems, multimedia devices, and the like. Computer system 1300 of FIG. 13 is well adapted to having peripheral non-transitory computer-readable storage media 1302 such as, for example, a floppy disk, a compact disc, digital versatile disc, other disc based storage, universal serial bus "thumb" drive, removable memory card, and the like coupled thereto.

System 1300 of FIG. 13 includes an address/data bus 1304 for communicating information, and a processor 1306A coupled with bus 1304 for processing information and instructions. As depicted in FIG. 13, system 1300 is also well suited to a multi-processor environment in which a plurality of processors 1306A, 13066, and 1306C are present. Conversely, system 1300 is also well suited to having a single processor such as, for example, processor 1306A. Processors 1306A, 1306B, and 1306C may be any of various types of microprocessors. System 1300 also includes data storage features such as a computer usable volatile memory 1308, e.g., random access memory (RAM), coupled with bus 1304 for storing information and instructions for processors 1306A, 1306B, and 1306C.

System 1300 also includes computer usable non-volatile memory 1310, e.g., read only memory (ROM), coupled with bus 1304 for storing static information and instructions for processors 1306A, 13066, and 1306C. Also present in system 1300 is a data storage unit 1312 (e.g., a magnetic or optical disk and disk drive) coupled with bus 1304 for storing information and instructions. System 1300 also includes an optional alphanumeric input device 1314 including alphanumeric and function keys coupled with bus 1004 for communicating information and command selections to processor 1306A or processors 1306A, 1306B, and 1306C. System 1300 also includes an optional cursor control device 1316 coupled with bus 1304 for communicating user input information and command selections to processor 1306A or processors 1306A, 1306B, and 1306C. In one embodiment, system 1300 also includes an optional display device 1318 coupled with bus 1304 for displaying information.

Referring still to FIG. 13, optional display device 1318 of FIG. 13 may be a liquid crystal device, cathode ray tube, plasma display device or other display device suitable for creating graphic images and alphanumeric characters recognizable to a user. Optional cursor control device 1316 allows the computer user to dynamically signal the movement of a visible symbol (cursor) on a display screen of display device 1018 and indicate user selections of selectable items displayed on display device 1318. Many implementations of cursor control device 1316 are known in the art including a trackball, mouse, touch pad, joystick or special keys on alphanumeric input device 1314 capable of signaling movement of a given direction or manner of displacement. Alternatively, it will be appreciated that a cursor can be directed and/or activated via input from alphanumeric input device 1314 using special keys and key sequence commands. System 1300 is also well suited to having a cursor directed by other means such as, for example, voice commands. System 1300 also includes an I/O device 1320 for coupling system 1300 with external entities. For example, in one embodiment, I/O device 1320 is a modem for enabling wired or wireless communications between system 1300 and an external network such as, but not limited to, the Internet.

Referring still to FIG. 13, various other components are depicted for system 1300. Specifically, when present, an operating system 1322, applications 1324, modules 1326, and data 1328 are shown as typically residing in one or some combination of computer usable volatile memory 1308 (e.g., RAM), computer usable non-volatile memory 1310 (e.g., ROM), and data storage unit 1312. In some embodiments, all or portions of various embodiments described herein are stored, for example, as an application 1324 and/or module 1326 in memory locations within RAM 808, computer-readable storage media within data storage unit 1312, peripheral computer-readable storage media 1302, and/or other tangible computer-readable storage media.

While one embodiment of the present invention have been described, it will be appreciated that those skilled in the art upon reading the specification and studying the drawings will realize various alterations, additions, permutations and equivalents thereof. It is therefore intended that embodiments of the present invention include all such alterations, additions, permutations, and equivalents as fall within the true spirit and scope of the invention as defined in the following claims. Thus, the scope of the invention should be defined by the claims, including the full scope of equivalents thereof.

What we claim is:

1. A virtual infrastructure management system comprising:
    one or more virtual machines;
    one or more host machines comprising:
        a central processing unit (CPU), a memory, and a storage,
        each of said one or more host machines communicatively coupled with a plurality of said one or more virtual machines;
        wherein at least one of said one or more host machines is a pre-configured hyper-converged computing device including pretested, pre-configured and pre-integrated storage, server and network components, including software and a hypervisor that supports a virtualization infrastructure located in an enclosure to enable a user to create a virtualization infrastructure and deploy said one or more virtual machines within 15 minutes after said one or more host machines is powered on for the first time, said pre-configured hyper-converged computing device has a single stock keeping unit (SKU) such that the upon purchase of said pre-configured hyper-converged computing device as a single SKU, said pre-configured hyper-converged computing device is not required to include any additional hardware or software to support and manage said virtualization infrastructure;
    a centralized management tool running on a server, said server comprising:
        a central processing unit (CPU), a memory, and a storage,
        said centralized management tool communicatively coupled with said one or more host machines;
    an object query language module that when executed causes a computing device to:
        utilize the object query language to provide a command to the one or more host machines and the one or more virtual machines, comprising:
            parsing the command into one or more actions and a query, the query includes a fetch operation to fetch information from the one or more host machines and the one or more virtual machines to determine one or more host machines and one or more virtual machines having a specific build date and last update timeframe;
            sending the query to a query processor, the query processor executing the query comprising:
                fetching a class of objects to interrogate the objects of the one or more host machines and the one or more virtual machines;
                storing the fetched class of objects locally;
                reducing/parsing the locally stored fetched class of objects to a subclass of the objects, wherein the subclass of objects are objects associated with virtual machines on hosts having the specific build date and last update timeframe; and
                binding the subclass of the objects to establish a binding set; executing the one or more actions on the binding set; and
            returning a result of the one or more actions;
            in response to returning the result, displaying the result of said command via a graphical user-interface.

2. The virtual infrastructure management system of claim 1, wherein said object query language module is not running on the same server as the centralized management tool, and wherein said object query language module communicates with the centralized management tool via an application program interface (API).

3. The virtual infrastructure management system of claim 1, wherein said object query language module is integrated with the centralized management tool.

4. The virtual infrastructure management system of claim 1, wherein said object query language module that when executed causes said virtual infrastructure management system to:
    parsing the results of the fetch of the class of objects to the subclass of the objects additionally based on
    all virtual machines having a host with the name.

5. The virtual infrastructure management system of claim 1, wherein said command is:
    a request for information about the one or more host machines,
    a request for information about the one or more virtual machines,
    an operational instruction to the one or more host machines, or
    an operational instruction to the one or more virtual machines.

6. A method for managing a virtual infrastructure via an object query language module, the method comprising:
    utilizing the object query language to provide a command to one or more host machines and one or more virtual machines, comprising:
        parsing the command into one or more actions and a query, the query includes a fetch operation to fetch information from the one or more host machines and the one or more virtual machines to determine one or more host machines and one or more virtual machines having a specific build date and last update timeframe;
        sending the query to a query processor, the query processor executing the query comprising:
            fetching a class of objects to interrogate the objects of the one or more host machines and the one or more virtual machines;

storing the fetched class of objects locally;
reducing/parsing the locally stored fetched class of objects to a subclass of the objects, wherein the subclass of objects are objects associated with virtual machines on hosts having the specific build date and last update timeframe; and
binding the subclass of the objects to establish a binding set;
executing the one or more actions on the binding set; and
returning a result of the one or more actions;
in response to returning the result, displaying the result of said command via a graphical user-interface,
wherein said one or more host machines comprises:
a central processing unit (CPU), memory, and storage, each of said one or more host machines communicatively coupled with a plurality of said one or more virtual machines; and
wherein at least one of said one or more host machines is a pre-configured hyper-converged computing device including pretested, pre-configured and pre-integrated storage, server and network components, including software and a hypervisor that supports a virtualization infrastructure located in an enclosure to enable a user to create a virtualization infrastructure and deploy said one or more virtual machines within 15 minutes after said one or more host machines is powered on for the first time, said pre-configured hyper-converged computing device has a single stock keeping unit (SKU) such that the upon purchase of said pre-configured hyper-converged computing device as a single SKU, said pre-configured hyper-converged computing device is not required to include any additional hardware or software to support and manage said virtualization infrastructure; and
a centralized management tool running on a server, said server comprising:
a central processing unit (CPU), a memory, and a storage, said centralized management tool communicatively coupled with said one or more host machines.

7. The method of claim 6, wherein said object query language module is not running on the same server as the centralized management tool, and
wherein said object query language module communicates with the centralized management tool via an application program interface (API).

8. The method of claim 6, wherein said object query language module is integrated with the centralized management tool.

9. The method of claim 6, further comprising:
reducing/parsing the results of the fetch of the class of objects to the subclass of the objects additionally selected based on
all virtual machines having a host with the name.

10. The method of claim 9, further comprising:
wherein said command is:
a request for information about the one or more host machines,
a request for information about the one or more virtual machines,
an operational instruction to the one or more host machines, or
an operational instruction to the one or more virtual machines.

11. A non-transitory computer-readable storage medium having instructions embodied therein that when executed cause a computer system to perform a method for managing a virtual infrastructure via an object query language module, the method comprising:
utilizing the object query language to provide a command to one or more host machines and one or more virtual machines, comprising:
parsing the command into one or more actions and a query, the query includes a fetch operation to fetch information from the one or more host machines and the one or more virtual machines to determine one or more host machines and one or more virtual machines having a specific build date and last update timeframe;
sending the query to a query processor, the query processor executing the query comprising:
fetching a class of objects to interrogate the objects of the one or more host machines and the one or more virtual machines;
storing the fetched class of objects locally;
reducing/parsing the locally stored fetched class of objects to a subclass of the objects, wherein the subclass of objects are objects associated with virtual machines on hosts having the specific build date and last update timeframe; and
binding the subclass of the objects to establish a binding set;
executing the one or more actions on the binding set; and
returning a result of the one or more actions;
in response to returning the result, displaying the result of said command via a graphical user-interface,
wherein said one or more host machines comprises:
a central processing unit (CPU), memory, and storage, each of said one or more host machines communicatively coupled with a plurality of said one or more virtual machines; and wherein at least one of said one or more host machines is a pre-configured hyper-converged computing device including pretested, pre-configured and pre-integrated storage, server and network components, including software and a hypervisor that supports a virtualization infrastructure located in an enclosure to enable a user to create a virtualization infrastructure and deploy said one or more virtual machines within 15 minutes after said one or more host machines is powered on for the first time, said pre-configured hyper-converged computing device has a single stock keeping unit (SKU) such that the upon purchase of said pre-configured hyper-converged computing device as a single SKU, said pre-configured hyper-converged computing device is not required to include any additional hardware or software to support and manage said virtualization infrastructure; and
a centralized management tool running on a server, said server comprising:
a central processing unit (CPU), a memory, and a storage, said centralized management tool communicatively coupled with said one or more host machines.

12. The non-transitory computer-readable storage medium of claim 11, wherein object query language module is not running on the same server as the centralized management tool, and wherein said object query language module communicates with the centralized management tool via an application program interface (API).

13. The non-transitory computer-readable storage medium of claim 12, further comprising:
   wherein said command is:
   a request for information about the one or more host machines,
   a request for information about the one or more virtual machines,
   an operational instruction to the one or more host machines, or
   an operational instruction to the one or more virtual machines.

14. The non-transitory computer-readable storage medium of claim 11, further comprising:
   reducing/parsing the results of the fetch of the class of objects to a subclass of the objects additionally selected based on
   all virtual machines having a host with the name.

* * * * *